United States Patent Office 2,767,234
Patented Oct. 16, 1956

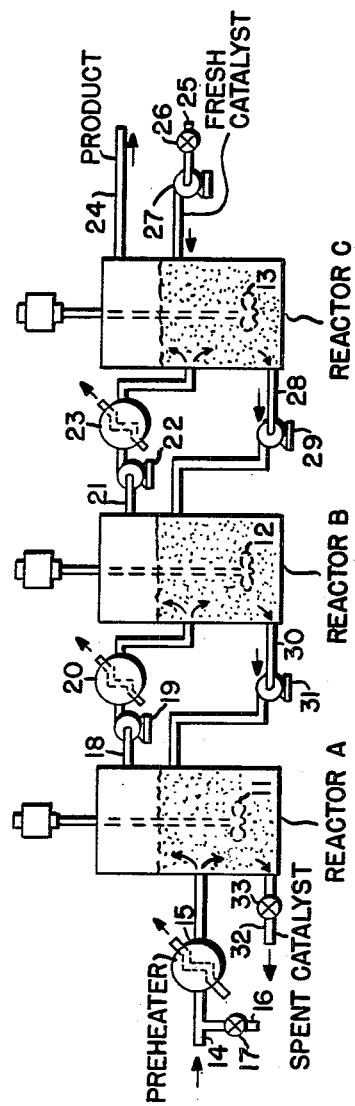

2,767,234

MULTI-STAGE POLYMERIZATION OF OLEFINS WITH SUSPENDED CATALYST

Louis Dauber, New York, N. Y., and Sumner B. Sweetser, Cranford, N. J., assignors to Esso Research and Engineering Company, a corporation of Delaware Application November 1, 1952, Serial No. 318,229

6 Claims. (Cl. 260—683.15)

This invention relates to a process for multi-stage polymerization of olefins employing a suspended polymerization catalyst. More particularly, it relates to a continuous, non-regenerative, multi-stage polymerization process in which normally gaseous olefins are polymerized to normally liquid polymers employing a solid, finely divided phosphoric acid catalyst maintained as an agitated suspension in hydrocarbon at relatively high pressure conditions.

Olefins are usually polymerized to relatively low molecular weight polymers suitable for inclusion in motor gasolines and for other uses by passing them through a fixed bed of solid, granular catalyst, such as phosphoric acid supported on a solid carrier. The polymerization reaction is highly exothermic, and difficulty has been experienced with controlling reaction zone temperatures, catalyst bed plugging, catalyst replacement, maintaining proper water of hydration levels, etc. in the tubular-type reactors.

These limitations on the prior art processes are overcome or minimized by continuous polymerization of olefins in the presence of a finely divided, solid phosphoric acid catalyst that is maintained as a dense suspension in a dense hydrocarbon phase comprising the olefins. The reactants and catalyst are agitated in order to obtain uniform distribution and suspension of the catalyst, to achieve heat balance within the reaction zone, and to maintain uniform temperature throughout the reaction zone. Heat control offers little difficulty even with feeds containing relatively high olefin concentrations, and substantially isothermal reaction conditions exist in the zone. This process is non-regenerative, i. e. the catalyst is used for long periods of time until spent, and fresh make-up catalyst is readily added to the reaction zone to replace withdrawn spent catalyst without having to discontinue operations.

The suspension polymerization technique is advantageously conducted in several stages operating in series. Since equilibrium olefin concentrations exist throughout each well-mixed zone, it is difficult to achieve high olefin conversions in a single stage. Multi-stage operation permits high olefin conversions to be obtained even when using feeds containing relatively high olefin concentrations.

This multi-stage operation, however, presents difficulties with respect to maintenance of the proper degree of water of hydration in the various stages. Thus, in a typical operation, olefin feed to the first stage is hydrated so that the partial pressure of water in the first reactor is balanced by the catalyst vapor pressure. The effluent from the first stage, which includes polymerized olefins, then goes to the second stage for further polymerization. This additional polymerization results in fewer mols of hydrocarbon in the second stage, for a given number of mols of water, than there were in the first stage. Since the number of mols of water remains constant throughout all stages, the mol fraction, and thus the partial pressure, of the water progressively increases in the second and subsequent stages. The water partial pressure is thus too high in any stage after the first stage, and the catalyst in these latter stages becomes overhydrated. This causes the catalyst to lose activity and strength prematurely. If water addition is such that any subsequent stage is correctly hydrated, the catalyst in previous stages will lose free acidity and activity and agglomerate because of underhydration. This problem becomes more serious the higher the olefin content of the feed since the relative change in mols of hydrocarbon becomes more pronounced. It is also correspondingly more serious when using catalysts sensitive to overhydration, such as the silica gel base catalysts.

In accordance with the present invention, the foregoing difficulties have been found to be overcome or minimized by the following expedient. A constant and correct amount of water of hydration is maintained in the first stage, and each successive reaction stage in the series is operated at successively higher temperatures in such a manner that the catalyst vapor pressure in each succeeding zone substantially balances the increased partial pressure of water in that zone. This is readily accomplished, for example, by adjusting the temperature of the total effluent passing from the first to the second of any two adjacent zones such that the successively higher temperatures and balanced vapor and partial pressures prevail.

This mode of operation permits the polymerization reaction to be carried out with feeds containing relatively high olefin contents, such as above about 45 to 80% and higher, with good activity and life maintenance for even the very sensitive catalysts. Furthermore it avoids the necessity of resorting to expensive and difficultly controlled procedures, such as partial dehydration of the effluent between stages, or complete dehydration of the effluent followed by rehydration to the desired level between reaction zones.

The present invention will be explained in detail in connection with the sole figure that illustrates a simplified flow plan of a preferred embodiment thereof.

Turning now to the drawing, three reaction zones, A, B, and C, are shown connected in series. Each reaction zone is provided with agitating means, such as propellers 11, 12 and 13, controlled by prime movers exterior to the zone. Each zone likewise contains a dense bed of finely divided, solid phosphoric acid suspended in fluid hydrocarbon. The agitating means help maintain uniform reaction conditions in the zones and keep the catalyst in suspension. By proper control of conditions, the catalyst may be maintained as a dense phase in the lower portions of the reaction zones with a substantially catalyst-free hydrocarbon phase in the upper portion of each zone. Each reaction zone is preferably operated at the same pressure.

The numeral 14 designates an olefin feed conduit fluidly communicating with reactor A. Conduit 14 includes a feed preheater 15 for heating the olefin feed up to any desired temperature level before it enters the reaction zone. Preferably, the feed will be preheated to a temperature such that the sensible heat of the feed up to the reaction zone temperature will substantially balance the exothermic heat of reaction evolved in the zone during polymerization.

Hydration water is conveniently introduced into the feed through branch line 16 containing control valve 17. The amount of water introduced with the feed should be such that its partial pressure in reactor A will substantially exactly balance the catalyst vapor pressure under the equilibrium reaction conditions existing in this zone. If desired, the water may be introduced in vapor or liquid form directly into reactor A. Another convenient mode consists of passing a portion or all of the feed through a water saturator under suitable conditions whereby the feed dissolves enough water to meet the above requirements.

The olefin feed contacts the catalyst in reactor A under suitable temperature, pressure and contact time conditions whereby substantial polymerization of olefin takes place. Substantially solid-free effluent is continuously withdrawn from the upper portion of reactor A by means of line 18 containing pump 19 and heat exchange means 20. Line 18 communicates with the catalyst phase in reactor B. The temperature level in reactor B will be higher than that in reactor A whereby the catalyst vapor pressure is increased to balance the increased water partial pressure in the effluent. Therefore, the effluent temperature will be adjusted in heat exchange means 20 whereby its sensible heat up to the higher reaction temperature will balance exothermic heat evolved in reactor B.

Additional polymerization takes place in reactor B. Effluent is withdrawn from this reactor by means of line 21, containing pump 22 and heat exchange means 23, and is introduced into reactor C. Since water vapor pressure will increase in reactor C, it must likewise operate at a higher temperature than reactor B to obtain balanced conditions. Necessary adjustments in effluent temperature are made in heat exchange means 23.

The desired olefin conversion level is attained in reactor C. Effluent including polymerized olefins is continuously withdrawn through conduit 24 and sent to a recovery means not shown. If desired, this effluent may be filtered or subjected to other separation means to remove any solid materials entrained therein, before it is sent to a fractionation zone.

Since it will usually be desired to maintain overall olefin conversions at above about 85%, it will be necessary to add fresh catalyst either continuously or intermittently. In order to attain the most effective utilization of the catalyst, it will be preferred to have the flow of catalyst countercurrent to that of fresh feed. This may be done by charging a slurry of fresh catalyst in polymer or other liquid hydrocarbon through line 25 containing valve 26 and pump 27 into the upper portion of the dense catalyst phase in reactor C. Suspended catalyst may be withdrawn from the bottom portion of reactor C through line 28, and pumped through pump 29 to the upper portion of the dense catalyst phase in reactor B. Likewise suspended catalyst may be withdrawn from reactor B through line 30 and pumped through pump 31 into the upper portion of the dense catalyst bed in reactor A. Spent catalyst is withdrawn from reactor A through line 32 containing valve 33 and discarded.

Another convenient method of achieving countercurrent flow of catalyst and feed is that of employing three reaction zones in series until the overall conversion of olefins reaches about 85%. At this point the first reactor may be withdrawn from the system making reactor B the first reaction zone. A reaction zone containing fresh catalyst is then connected in series to reactor C. The polymerization is continued until olefin conversion reaches a low level. Again, the first reactor may be removed from the system and a reactor containing fresh catalyst added in the last position.

The system has been described in connection with stirred reaction zones. It is equally applicable, however, to systems in which the catalyst is maintained in suspension in hydrocarbon by passing olefin feed upwardly therethrough, by recycling and jetting a portion of the effluent back into the suspension for agitation purposes, or by other means known to the art.

Although a multi-stage polymerization system has been shown employing three reactors, it will be obvious that 2, 4 or even more reactors in series may be used effectively to obtain high olefin conversions and long catalyst life.

The catalyst used in the practice of the present invention is preferably one comprising phosphoric acid deposited on a siliceous support such as silica gel, kieselguhr, and the like. The catalyst will usually contain from about 50 to 90% phosphoric acid by weight and preferably from 75% to 85% by weight phosphoric acid in order to obtain effective olefin conversions. This invention has particular application to silica gel supported catalysts since these siliceous materials are extremely sensitive to under- or over-hydration conditions. The fresh catalyst may have a size in the range of 20 to 200 mesh or higher, preferably larger than 100 mesh; however, some attrition of catalyst will occur during the reaction and particles as fine as 300 mesh, or finer, will be formed. The term "finely divided, solid phosphoric acid catalyst" refers herein to catalysts of such sizes.

The polymerization temperature will usually be in the range of about 300 to 600° F.; however, temperatures of from about 425° to 525° F. will be preferred in order to obtain high olefin conversions and to minimize the formation of carbonaceous material on the catalyst. Pressures in the range of about 450 to 1500 p. s. i. g. or higher should be used. Pressures are preferably maintained at above 900 p. s. i. g. Under these conditions a single, relatively dense hydrocarbon fluid phase exists which is conducive to high olefin conversions because of increased contact time, to ease of maintenance of catalyst in suspension, and to a continuous washing action on the catalyst which is beneficial in prolonging the active life of the catalyst.

It is generally desired that an olefin conversion of at least 75% be attained, with preferable conversion levels of about 85%. It will usually be necessary, under the temperature and pressure conditions prevailing, to employ space velocities in the range of about 0.1 to 2.5 gallons of feed per pound of catalyst (G./H./P.).

In carrying out the process of this invention, it is first necessary to determine the vapor pressure characteristics of the catalyst at various temperature levels under olefin polymerizing conditions. A temperature level that will give partial but substantial olefin conversion is selected for the first stage. This temperature should be one that gives a favorable relationship between overall olefin conversion and catalyst life. Since the catalyst vapor pressure is known, the water requirement for obtaining balanced conditions in the first stage is readily determined.

Additional olefin conversion occurs in the second zone which decreases the total mols of hydrocarbon. Since total water content is constant, the mol fraction of the water, and its partial pressure, increases in the equilibrium mixture in the second stage. A higher temperature level is therefore selected for the second stage that will give a higher catalyst vapor pressure balancing the increased water partial pressure. This procedure is repeated for any succeeding stages until reaction temperatures for each stage have been determined.

In a typical operation, a $C_3$ feed containing 50% propylene is polymerized in three stages operating in series with a silica gel base catalyst (80% $H_3PO_4$–20% $SiO_2$) in each stage. The reaction pressure in each stage is 1000 p. s. i. g. $C_9$ polymer is the predominant product.

A reaction temperature of 450° F. is selected for the first stage, at which temperature olefin conversion is 50%. At this temperature, the catalyst vapor pressure is approximately 160 mm. mercury (Hg). Since the equilibrium concentrations of hydrocarbons in the first reaction zone are known, it is readily determined by conventional calculations that the olefin feed must contain about 0.19 mol percent water in order to give a balancing partial pressure of water in the first stage of 160 mm. Hg. The following constants are used in these calculations.

| Component | Critical Pressure, Atmospheres | Critical Temperatures, ° Rankine |
|---|---|---|
| $C_3$ hydrocarbons | 42 | 666 |
| $C_9$ hydrocarbons | 23 | 1,072 |
| Water | 218 | 1,165 |

The second stage is operated to give an additional 25% conversion of the olefins. The equilibrium reaction mixture in this stage consequently contains fewer mols of hydrocarbon and a higher mol percent water than that in the first stage. It is likewise determined that a reaction temperature of 470° F. will give water partial pressure of about 180 mm. Hg which substantially balances the catalyst vapor pressure of about 180 mm. Hg at this temperature.

The third stage is operated to give an additional olefin conversion of 14% to obtain an over-all conversion of 89%. The temperature in this zone is increased to 490° F. whereby the water partial pressure of 198 mm. Hg substantially balances the catalyst vapor pressure of 199 mm. Hg.

The summarized operating, composition and vapor pressure data for the various stages is shown in the following table, on the basis of 100 mols of olefin feed containing 0.19 mol percent $H_2O$.

| Stage | Olefin Feed | First | Second | Third |
|---|---|---|---|---|
| Reaction Temperature, °F | | 450 | 470 | 490 |
| Total Olefin Conversion, percent | | 50 | 75 | 89 |
| Equilibrium Composition of Reaction Zone: | | | | |
| Propane, mols | 49.90 | 49.90 | 49.90 | 49.90 |
| Propylene, mols | 49.91 | 24.96 | 12.48 | 5.49 |
| Nonenes, mols | | 8.32 | 12.48 | 14.80 |
| Water, mol | 0.19 | 0.19 | 0.19 | 0.19 |
| Total | 100 | 83.37 | 75.05 | 70.38 |
| Propane, mol percent | 49.90 | 59.85 | 66.49 | 70.90 |
| Propylene, mol percent | 49.91 | 29.94 | 16.63 | 7.80 |
| Nonenes, mol percent | | 9.98 | 16.63 | 21.03 |
| Water, mol percent | 0.19 | 0.23 | 0.25 | 0.27 |
| Pressure, mm. Hg: | | | | |
| Water Partial Pressure | | 161 | 180 | 198 |
| Catalyst Vapor Pressure | | 161 | 180 | 199 |

It is seen that the total mols of hydrocarbon gradually decreases and the water to hydrocarbon mol ratio increases as olefin conversion is increased. By increasing reaction temperature from stage to stage within controlled limits, the increased water partial pressure is offset by increased catalyst vapor pressure. This mode of operation is advantageous not only in increasing catalyst life but also in permitting greater flexibility for attaining desired conversion levels in the several stages.

It is generally preferred that the water partial pressure in each zone substantially exactly balance catalyst vapor pressure; i. e., be within about ±5 to ±10% of the catalyst vapor pressure at all times. Prolonged operation outside of these ranges will lead to the difficulties heretofore described.

The extent to which the temperature is increased from stage to stage will depend chiefly on the concentration of olefins in the feed, the difference in conversion levels between adjacent stages, and the vapor pressure characteristics of the particular solid phosphoric acid catalyst being used. As a general rule, the temperature increase from any one stage to an adjacent stage will be in the order of about 5° to 50° F., more usually about 10° to 30° F. If difficulty is experienced in obtaining a desired conversion level for maintaining the balanced conditions at a constant contact time in each stage, contact times may be varied from stage to stage to give greater flexibility. This may be done, for example, by using different sized reaction zones. Reaction pressures may be varied from stage to stage in order to change conversion relationships, but this procedure is generally too costly and complicated for most applications.

The amount of water injected into the first reaction zone will depend almost entirely on the nature of the catalyst and the reaction temperature in this zone. Generally, in the range of about 0.1 to 2 gallons of water per 1000 gallons of olefin feed will be suitable for the conventional solid phosphoric acid catalysts.

The extent to which olefin conversion is increased from stage to stage will vary depending on the number of stages employed and the total over-all conversion desired. If only two stages are used, conversion in the first stage will usually be at least about 60 to 70%. With more stages, first stage conversion might be 40 to 60% or so, with successively decreasing conversions in subsequent stages until an over-all conversion of 80 to 95%, or even higher, is obtained.

It will be obvious to the skilled workman that the present invention may be used under a wide range of conditions and with a variety of olefins without departing from the spirit and scope thereof.

What is claimed is:

1. A continuous, non-regenerative catalytic process for polymerizing olefins which comprises the steps of maintaining a well-mixed suspension of finely divided solid phosphoric acid catalyst in fluid hydrocarbon in each of a plurality of reaction zones connected in series, each of said zones being maintained at polymerization conditions, introducing olefin feed into the first of said zones maintained at a temperature whereby substantial olefin conversion occurs, introducing sufficient water into said first zone whereby its partial pressure substantially equals the vapor pressure of said catalyst, withdrawing effluent including unreacted olefins and water from the first of any two adjacent reaction zones and introducing it, without adding additional water, into the second of said adjacent zones, polymerizing a substantial portion of unreacted olefins in each of said reaction zones, and successively increasing reaction temperatures in said zones whereby water partial pressure in a given reaction zone substantially equals the catalyst vapor pressure in that reaction zone.

2. A process as in claim 1 wherein said reaction temperatures are successively increased in the range of about 5° to 50° F.

3. A process as in claim 2 wherein said reaction temperatures are in the range of about 300° to 600° F.

4. A process as in claim 3 wherein said catalyst is a silica gel base catalyst.

5. A process as in claim 4 wherein said feed contains at least about 45% olefins.

6. A process as in claim 5 wherein said water partial pressure in each reaction zone is within ±5% of the catalyst vapor pressure in that zone.

References Cited in the file of this patent

UNITED STATES PATENTS

| | | |
|---|---|---|
| 2,245,143 | Gerhold | June 10, 1941 |
| 2,353,832 | Kemp | July 18, 1944 |
| 2,470,904 | Shanley | May 24, 1949 |
| 2,626,289 | Russell | Jan. 20, 1953 |